United States Patent
Taverne

(10) Patent No.: US 9,090,515 B2
(45) Date of Patent: Jul. 28, 2015

(54) METHOD FOR CONCRETE CRACK REPAIR

(71) Applicant: Thomas Taverne, Vernon, NY (US)

(72) Inventor: Thomas Taverne, Vernon, NY (US)

(*) Notice: Subject to any disclaimer, the term of this patent is extended or adjusted under 35 U.S.C. 154(b) by 244 days.

(21) Appl. No.: 13/783,356

(22) Filed: Mar. 3, 2013

(65) Prior Publication Data

US 2014/0248460 A1 Sep. 4, 2014

(51) Int. Cl.
*C04B 41/53* (2006.01)
*B29C 73/26* (2006.01)
*E04G 23/02* (2006.01)

(52) U.S. Cl.
CPC ............... *C04B 41/53* (2013.01); *B29C 73/26* (2013.01); *E04G 23/0203* (2013.01); *Y10T 428/20* (2015.01)

(58) Field of Classification Search
CPC .... Y10T 428/20; B29C 73/02; E04G 23/0203
USPC ................................ 428/63; 264/33.18, 36.2
See application file for complete search history.

(56) References Cited

U.S. PATENT DOCUMENTS

| 4,565,579 A | 1/1986 | Fujioka |
| 5,771,557 A | 6/1998 | Contrasto |
| 7,308,892 B2 | 12/2007 | Cockerell |
| 7,572,852 B1 | 8/2009 | Ware |
| 8,146,309 B1 | 4/2012 | Logemann |

OTHER PUBLICATIONS

Bustar Expanding Grout, Technical page 2011, www.demolitiontechnologies.com.

*Primary Examiner* — Brent O'Hern
(74) *Attorney, Agent, or Firm* — Bernhard P. Molldrem, Jr.

(57) ABSTRACT

A method for repairing an open shrinkage crack in a concrete slab employs expansive mortar. A saw cut is created next to the shrinkage crack, and then expansive mortar is applied into the open saw cut. The expansive mortar material gradually expands and urges the saw cut apart. This shifts the portion of the slab between the saw cut and the slab in the direction to close the shrinkage crack tightly. The expanded mortar material is removed from the saw cut and a rigid spacer is installed in the saw cut. An adhesive can be installed between the two sides of the crack. The surface of the repaired slab can be given cosmetic repairs, and let dry before applying a sealer.

7 Claims, 6 Drawing Sheets

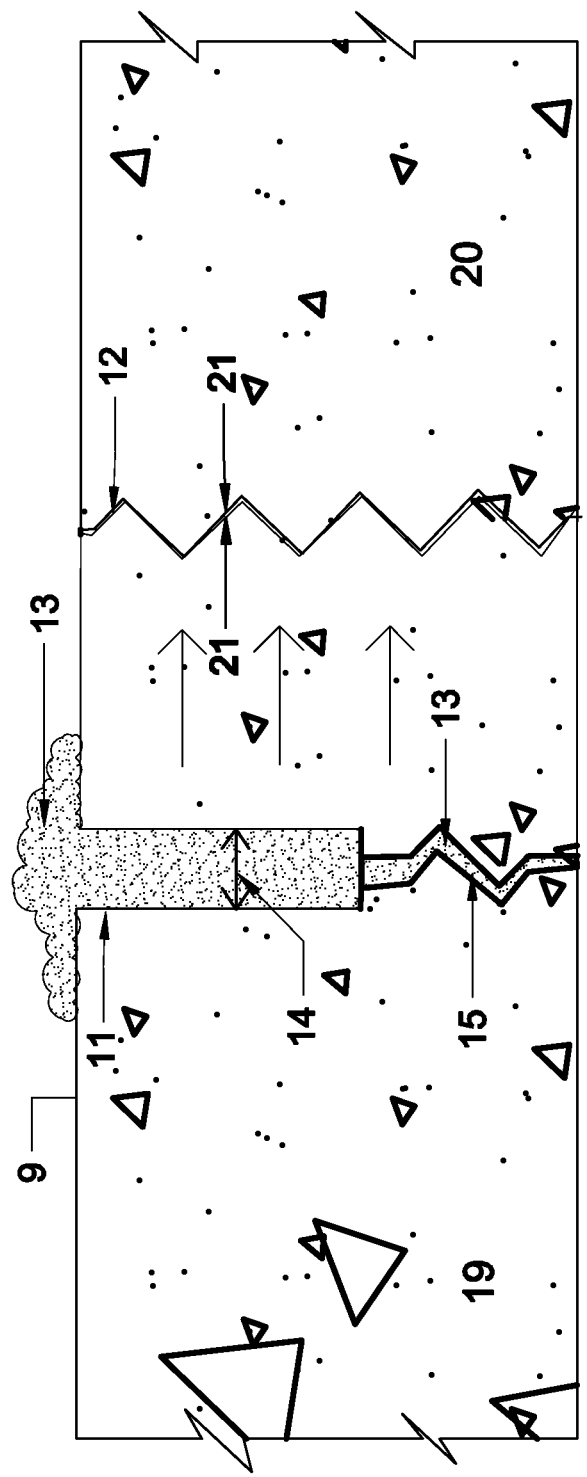

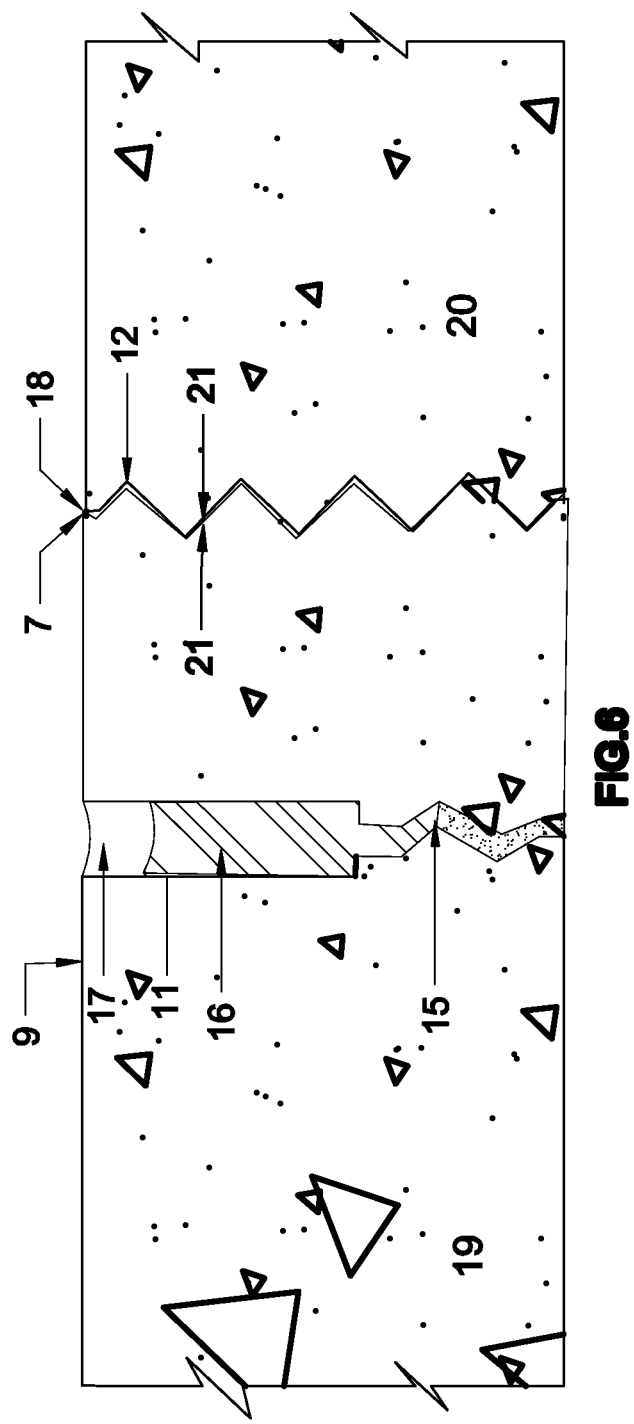

METHOD FOR CONCRETE CRACK REPAIR

BACKGROUND

Prior Art

The following is a tabulation of some prior art that presently appears relevant:

| U.S. Patents | | | |
| --- | --- | --- | --- |
| Patent Number | Kind Code | Publ. Date | Patentee |
| 4,565,579 | | Jan. 21, 1986 | Fujioka |
| 5,771,557 | | Jun. 30, 1998 | Contrasto |
| 7,308,892 | B2 | Jan. 18, 2007 | Cockerell |
| 8,146,309 | B1 | Apr. 3, 2012 | Logemann |
| 7,572,852 | B1 | Aug. 11, 2009 | Ware |

NONPATENT LITERATURE DOCUMENTS

"Mechanical cracking of saw cut joints in concrete slabs on ground to eliminate the need for steel reinforcement", Allen Cockerell, Concrete Slab Technology Pty Ltd
"Methods of concrete crack repair" www.theconstructor.org
"Bustar Expanding Grout Technical Page" www.demolition-technologies.com
"Crusting Cracks" www.indecorativeconcrete.com
"Concrete cracking. It happens. Here's how to fix it." Kim Basham PhD, PE www.lmcc.com There are many methods for repairing concrete where the crack goes all the way through the concrete and has a gap. This type of crack can be called an open shrinkage crack. These gaps are often left unrepaired. The crack is often less noticeable than a repair. Adding a saw cut on top of a crack will conceal a crack by making it appear to be a saw cut control joint. Longer, wider or crooked cracks that have a gap can be filled with various products to protect against water intrusion, weed control, improve load transfer and improve general appearance. Structural repairs can include epoxy to bond pieces together, steel bars installed at intervals across a crack or a combination of both. A cracked concrete section can be cut out, demolished and replaced. Full slab removal and replacement may be an option when concrete is severely degraded or an exact color match is required.

U.S. Pat. No. 4,565,579 discloses an expansive mortar composition for breaking rock and concrete. The composition is commonly used for demolition purposes. Holes are drilled into the breakable material. The expansive mortar is poured into the holes where pressure builds and breaks the concrete or rock in an irregular way.

U.S. Pat. No. 5,771,557 shows a metal stitching method of repairing concrete cracks. In this method the concrete surface is patched when the crack is filled. It would be very difficult to match the color of the patch with the color of the concrete being patched. This structural repair method is used in anticipation of a full resurfacing repair.

U.S. Pat. No. 7,308,892 shows a method of making the concrete crack from below the slab. This method would leave a jagged somewhat straight crack. It would require a saw cut through the middle of each crack to make them have a more finished appearance.

U.S. Pat. No. 8,146,309 shows a crack inducer with a drainage channel at the base of the slab. This will create an unfinished crack at the top of the slab.

U.S. Pat. No. 7,572,852 shows a patching material for fixing exposed aggregate concrete. This will require a great deal of time to get a good color match. The repaired crack is likely to reoccur in the same location if a saw cut is not installed to relieve the pressures that caused the original crack.

All the crack repair methods heretofore known suffer from a number of disadvantages:
(a) Crack fill repairs make a crack extremely noticeable by highlighting the crack.
(b) Coloring the crack filler material to make an exact color match with the concrete is nearly impossible.
(c) An exact color match between batches of concrete is nearly impossible.
(d) Concrete is installed in uncontrolled environmental conditions that cause some of the color matching problems.
(e) The difficulty of color matching concrete increases as the concrete ages.
(f) Aesthetic repairs are often required to cover a visible crack repair.
(g) Installing some inches of new concrete over an entire area can be done to cover the top of unsightly concrete.
(h) Concrete resurfacing with ¼ to ⅜ inch of polymer modified type cement can be as expensive as four inches of new concrete.
(i) Spray applied concrete resurfacing materials, colorants, colored sealers or any combination can be used on a section or an entire area to conceal a damaged surface.
(j) Carpet or tile can be required to cover cracked concrete.
(k) Rework of mismatched colors to improve aesthetics is time consuming and costly.
(l) Concrete demolition is very labor intensive.
(m) Installation of concrete is very labor intensive.
(n) Installing a straight line saw cut on a crooked or bowed crack will only partially conceal the crack.
(o) Saw cut repairs are limited to concealing straight cracks.
(p) Saw cut repairs are limited to cracks that fall in line with the standard control joint layout.
(q) Repairs may require removing a concrete section between a saw cut and a path of a jagged crack that results in the major challenges of unsightly patching and mismatching color as obstacles to a successful repair.

SUMMARY

In accordance with one embodiment a new method for concrete crack repair comprises a saw cut control joint near the crack and placing expansive mortar in the saw cut to apply pressure inside the saw cut whereby it opens the saw cut and closes the crack. The saw cut is then cleared of expansive mortar and fitted with an epoxy plug to hold the saw cut in the open position. Epoxy is placed inside the closed crack to bond both sides of the crack together. A cosmetic treatment is now possible to the top of the closed crack and caulk to the opened saw cut.

Advantages

Accordingly several advantages of one or more aspects are as follows: to provide a very tight crack, that is easy to cosmetically touch up, that increases load transfer across the crack, that develops interlocking action of aggregate particles on the face of the crack, that creates a control joint that isolates future movement, that spreads an active control joint, that transfers the width of the crack to the control joint, that is aesthetically pleasing, that is less noticeable, that will be bonded together with low viscosity epoxy, that produces the control joint that distracts the eye away from the closed crack, that eliminates the need to remove a concrete section, that eliminates the need to resurface or cover unsightly patching, that lowers the skill level required of craftsmen performing a crack repair, that can be cosmetically treated in similar ways as crusting cracks in decorative concrete, that eliminates the need to fill a crack, that eliminates caulking cracks, that reduces patching to pop outs that may have occurred along the top edge of a jagged crack, that reduces the labor required to make the repair, that can be held in place with the control joint spacer, that does not require coloring, that is aesthetically superior, that is easier to repair, that can be applied again to close the larger crack, that is economical, that increases job site profitability, that increases jobsite safety, that reduces the number of tools required to fix the job, etc.

BRIEF DESCRIPTION OF THE SEVERAL VIEWS OF THE DRAWINGS

FIG. 5 shows a side view of expansive mortar, expansive pressure inside the saw cut, the crack created at the bottom of the saw cut and the closed shrinkage crack in a concrete slab.

FIG. 6 shows a side view of a completed repair including a rigid spacer, caulk, expansive mortar, location of cosmetic repairs and the closed shrinkage crack in a concrete slab.

Figure 1:
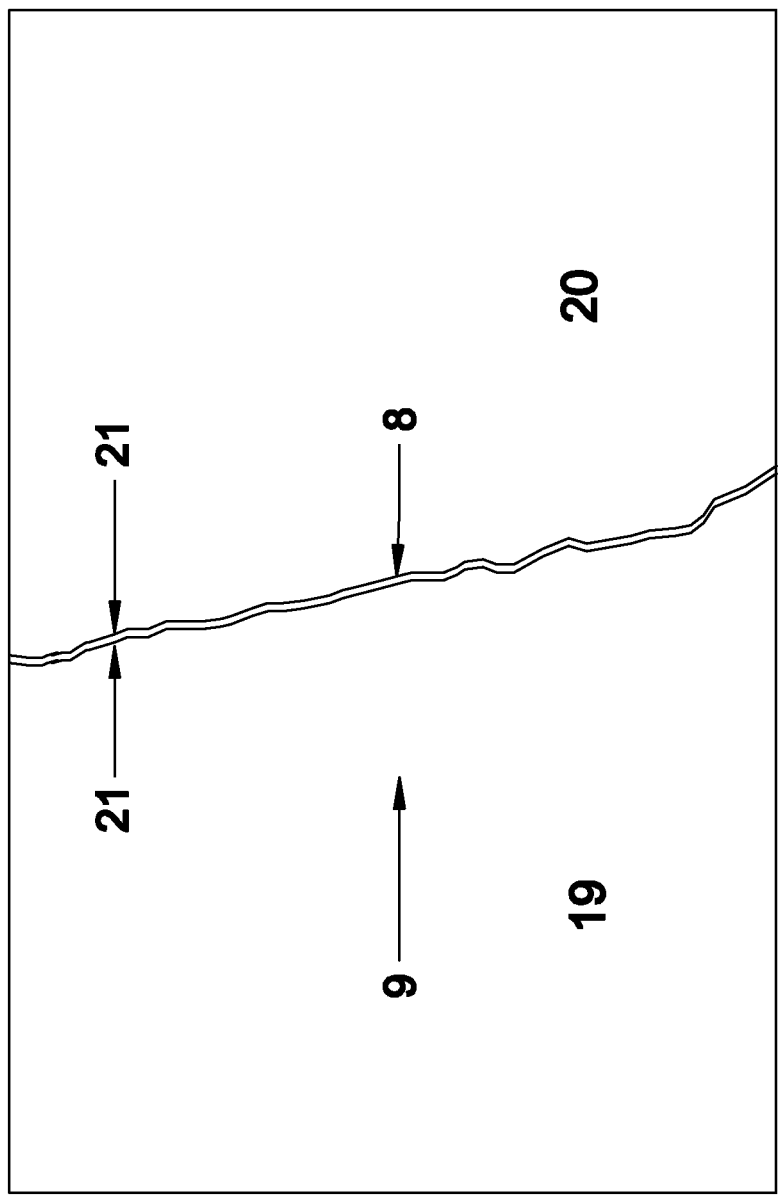
FIG. 1 shows a top view example of an open shrinkage crack in a concrete slab.

| Drawings-Reference Numerals | |
|---|---|
| 7 | cosmetic surface repair |
| 8 | open shrinkage crack |
| 9 | finished concrete slab |
| 10 | saw cut |
| 11 | wider saw cut |
| 12 | closed shrinkage crack |
| 13 | expansive mortar |
| 14 | created crack |
| 15 | rigid spacer |
| 16 | caulk |
| 17 | adhesive |
| 18 | dam |
| 19 | concrete piece number one |
| 20 | concrete piece number two |
| 21 | cracked edges |

DETAILED DESCRIPTION OF THE INVENTION

Figure 2:
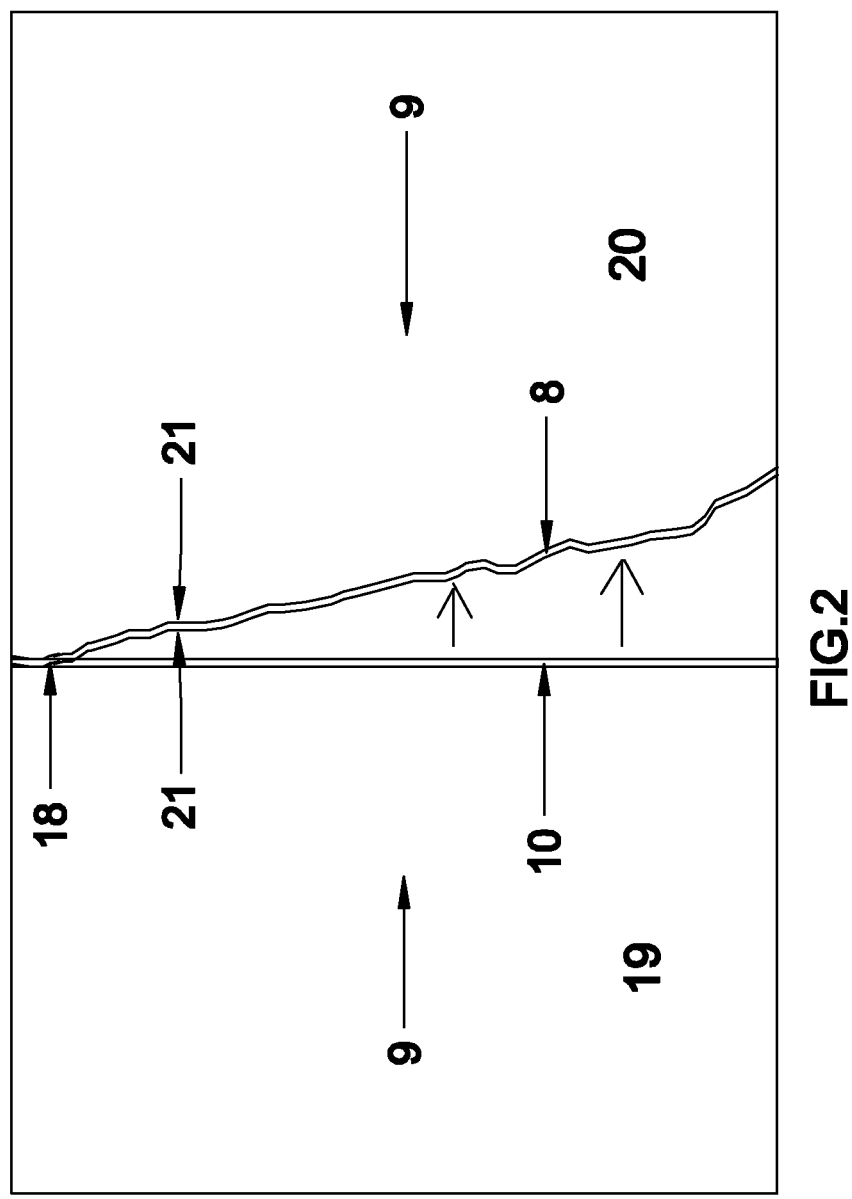
FIG. 2 shows a top view of the open shrinkage crack, a dam and a saw cut that receives the expansive mortar application in a concrete slab.
Figure 3:
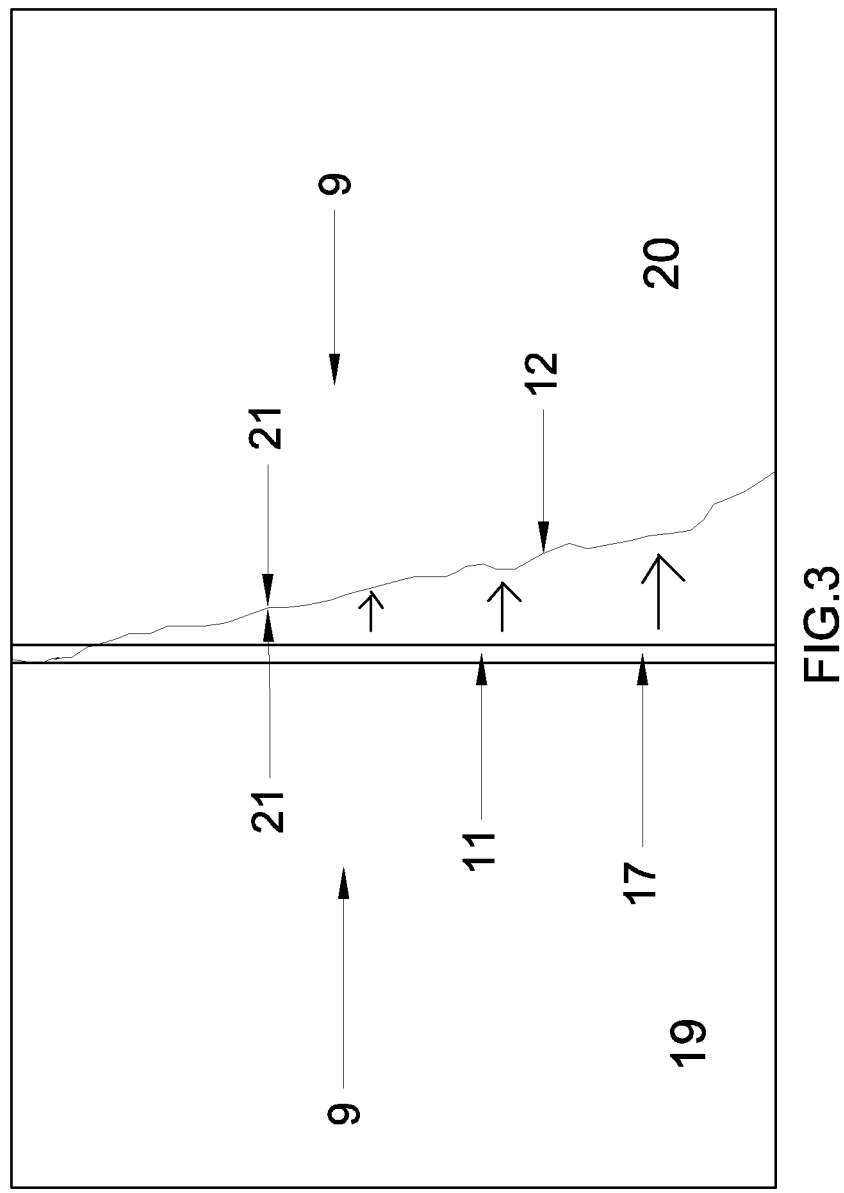
FIG. 3 shows a top view of a completed repair including an expanded saw cut and a closed shrinkage crack in a concrete slab.
Figure 4:
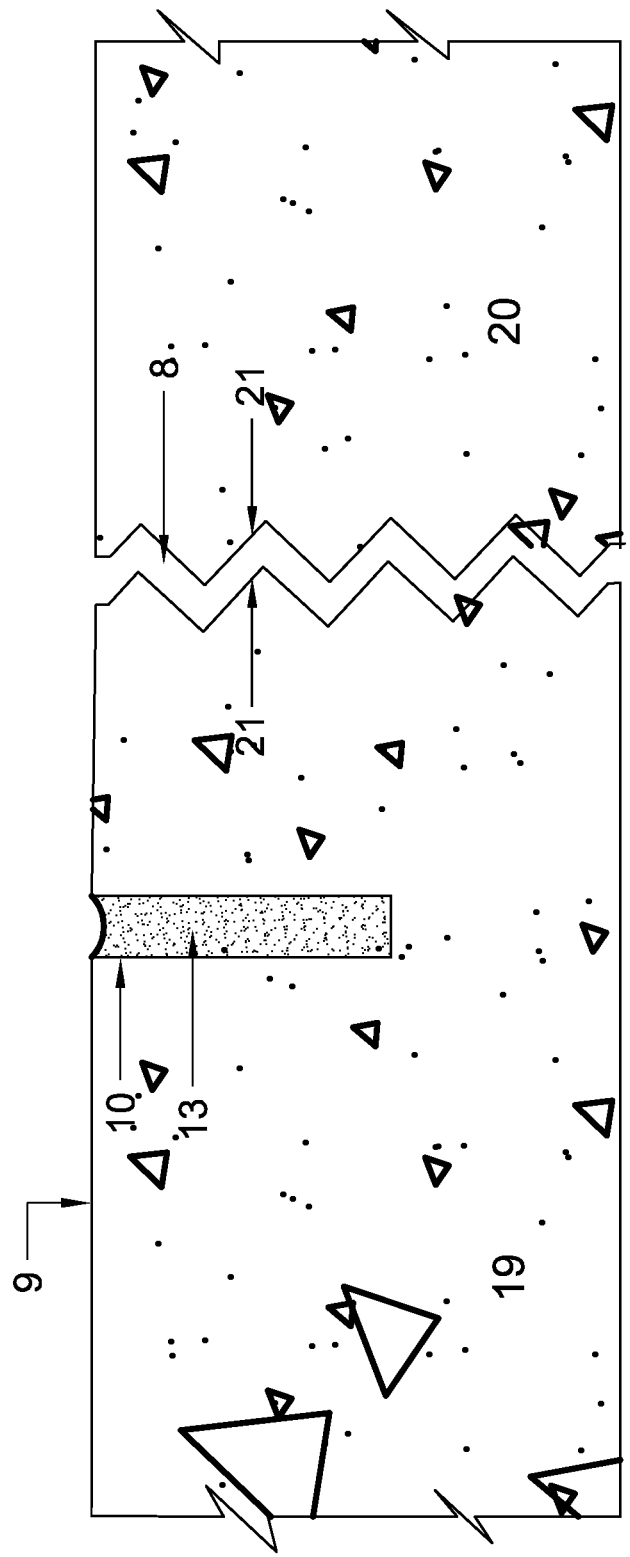
FIG. 4 shows a side view of a saw cut, an open shrinkage crack with the newly placed expansive mortar in a concrete slab.

One embodiment of a crack repair method is illustrated in FIGS. 1, 2 and 3 (top view) and FIGS. 4, 5 and 6 (side view). The repair begins with planning the location of a saw cut 10 that balances aesthetics and close proximity to the open shrinkage crack 8 located on concrete piece number one 19. The completed saw cut 10 should not appear askew. Create a dam 18 inside the saw cut 10. Restrict expansive mortar 13 from any area where the saw cut 10 runs inside the open shrinkage crack 8 in order to confine pressure and not spread concrete piece number one 19 and concrete piece number two 20 apart. Expansive mortar 13 is mixed to a fluid consistency and poured into the saw cut 10 being treated adjacent the crack. The expansive pressure generated by the expansive mortar 13 will create a crack 14 at the bottom of the saw cut 10 and progresses to move one side of the saw cut 10 and simultaneously close the shrinkage crack 12. The cracked edges 21 of concrete are held in place with the interlocking aggregate inside the closed shrinkage crack 12, a rigid spacer 15 in the saw cut 10 and adhesive 17 in the closed shrinkage crack 12. A cosmetic surface repair 7 is optionally made to the top of the closed shrinkage crack 12.

Alternative Embodiments

In one embodiment, expansive mortar is used to facilitate pressure inside the saw cut. However, the pressure can be developed from any other material that can be placed inside the saw cut that develops sufficient expandable pressure to open the saw cut, such as foam, plastic, polyethylene, polypropylene, vinyl, nylon, rubber, leather, various impregnated or laminated fibrous materials, various plasticized materials, cardboard, paper, etc.

In one embodiment, the rigid spacer used to hold the control joint is made of epoxy. The rigid spacer can be of made of any other material that can be placed inside the saw cut to hold the prescribed separation and the crack tightly in place, such as cement, mortar, foam, polyethylene, polypropylene, vinyl, nylon, rubber, leather, various impregnated or laminated fibrous materials, various plasticized materials, cardboard, paper, etc.

In one embodiment, gravity fed epoxy is used as adhesive to hold the cracked concrete pieces together. The adhesive can be of any other material installed in the crack designed to bond the pieces together. The adhesive can be installed before the crack closes, after closure or both. The adhesive can have long or short set times and consist of various materials such as film, fabrics, foam, polyethylene, polypropylene, vinyl, nylon, rubber, leather, various impregnated or laminated fibrous materials, various plasticized materials, cardboard, paper, etc.

In one embodiment, the saw cut is of sufficient depth to receive the expansive mortar. The saw cut can be of varying depths. Best results are achieved when the saw cuts down to the top of the steel reinforcement in the slab. The steel will remain in place and give support across the newly formed control joint. Sometimes reinforcement steel is too high in the slab and may inadvertently be cut when installing the saw cut control joint. Consequently, the concrete is supported by the compacted base material under it and the epoxy interlocking the crack at the bottom of the saw cut.

Advantages

From the description above, a number of advantages of some embodiments of my new method for concrete crack repair become evident:
 (a) The tightly closed shrinkage crack can be treated with cosmetic repairs that produce aesthetically pleasing results.
 (b) The tightly closed shrinkage crack can be left untouched and produce aesthetically pleasing results.
 (c) The expansive action of the mortar in the saw cut creates an active control joint.
 (d) Expansion and contraction movement of the repaired concrete slab are directed toward the new control joint.

(e) Expansion and contraction movement of the repaired concrete slab are directed away from the repaired crack.
(f) A saw cut control joint omitted from the original concrete installation can be added after a crack has occurred.
(g) The expansive mortar does not stain the concrete surface like other materials.
(h) This method does not require full resurfacing.
(i) This method does not require new concrete.
(j) The cracked concrete becomes the repair material.
(k) The cracked concrete is an exact color match.
(l) The demolition becomes unnecessary.
(m) The new control joint will distract the eye and render a tight crack less noticeable.
(n) The damage from striking or prying is avoided by activating the control joint with expansive mortar.
(o) The pressure generated with expansive mortar is uniform inside the saw cut.
(p) The pressure generated is internal and does not chip the top surface.
(q) The entire crack shifts simultaneously without pinch points.
(r) The repair can be done by one person.

Accordingly, the reader will see that the new method for concrete crack repair of various embodiments can be used to repair cracks easily and conveniently, can be used where a control joint should have been installed, can produce better quality repairs, is an exact color match and is economical. In addition, when cracks are repaired, the active control joint created enhances the durability of the crack repair and so reduces jobsite call backs by increasing the repair performance. Furthermore, the new method for concrete crack repair has the additional advantages in that:

It permits increased speed in repair;
It permits increased quality of repair;
It permits reduction in man power to make the repair;
It permits using the existing concrete in the repair;
It permits a new option for the repair man;
It permits trial and error when selecting control joint placement;
It permits increases work place safety; and
It permits increases work efficiency.

Although the description above contains much specificity, these should not be construed as limiting the scope of the embodiments but merely providing illustrations of some of the several embodiments. For example, the saw cut can have various sizes and shapes; the saw cut can have various depths; the shrinkage crack can be of various shapes, sizes and angles; the expansive mortar can be of various compositions of matter; the adhesive can be of various forms of matter; the closed shrinkage crack can be partially bonded; the adhesive can be omitted in the closed shrinkage crack; the epoxy bond inside the closed crack can individually hold the piece in place; the rigid spacer can be relied upon in combination with the interlocking aggregate to keep the pieces in place; the rigid spacer can be of any form of matter; the rigid spacer can be bonded to one side of the saw cut; the rigid spacer can be bonded to neither side of the saw cut; the rigid spacer can be bonded to both sides of the saw cut; the rigid spacer can be held in place by friction; the rigid spacer can have a finished the top surface to replace the caulk; the control joint can be held open with any form of matter, etc.

Thus the scope of the embodiments should be determined by the appended claims and their legal equivalents, rather than by the examples given.

I claim:

1. A dynamic method of repairing a crack that has occurred in a concrete slab, wherein the crack occurs along a surface of the slab with sides of the crack having separated to define a gap between them within the crack; the method comprising:
    forming a saw cut along said surface and across said slab and extending down at least partway through the slab, such that a portion of the slab lies between the saw cut and said crack;
    applying into said saw cut a fill of an expansive material of the type that expands after having been applied into the saw cut;
    allowing the expansive material to expand and urge said portion of the slab so as to move said portion and urge the sides of the crack together and close the gap between the sides of the crack;
    removing the expansive material from said saw cut; and
    applying a permanent fill material into said saw cut.

2. The dynamic method of repairing a crack according to claim 1, including applying an adhesive between the sides of said crack.

3. The dynamic method of repairing a crack according to claim 1, including installing a rigid spacer within said saw cut.

4. The dynamic method of repairing a crack according to claim 1, wherein said saw cut extends only partway through said slab, and said allowing the expansive material to expand includes allowing the concrete in the slab directly beneath the saw cut to split, thereby creating an expansion joint at said saw cut.

5. The dynamic method of repairing a crack according to claim 1, comprising applying a caulk into said saw cut.

6. A dynamic method of creating a controlled crack in a slab of concrete, the slab having an upper surface and a depth defined between the upper surface and a lower side of the slab; comprising
    creating a saw cut extending across said upper surface and extending partway to the lower side, the saw cut having side walls with a gap therebetween;
    applying into said saw cut a fill of an expansive material of the type that expands and urges said walls of the saw cut apart, and allowing the expansive material to expand sufficiently to create a crack in said concrete slab between the saw cut and the lower side of the slab below the saw cut; and
    removing the expansive material from said saw cut.

7. The dynamic method according to claim 6 further comprising applying a rigid spacer into the crack created beneath said saw cut.

* * * * *